United States Patent [19]

Mears et al.

[11] Patent Number: 4,780,989
[45] Date of Patent: Nov. 1, 1988

[54] HYDROPONIC ASSEMBLY

[75] Inventors: Stowell W. Mears, Tolland; Kris Johnson, Storrs; Yves Kraus, Mansfield, all of Conn.

[73] Assignee: Mears Structures, Inc., Storrs, Conn.

[21] Appl. No.: 857,259

[22] Filed: Apr. 30, 1986

[51] Int. Cl.[4] .............................................. A01G 31/02
[52] U.S. Cl. .......................................... 47/65; 47/64
[58] Field of Search ................... 47/17, 18, 65, 59–64, 47/DIG. 6

[56] References Cited

U.S. PATENT DOCUMENTS

| | | |
|---|---|---|
| 3,398,481 | 8/1968 | Lake .................................... 47/17 X |
| 3,433,940 | 3/1969 | Baez et al. . |
| 3,636,725 | 1/1972 | MacCracken . |
| 3,983,713 | 10/1976 | MacCracken . |
| 4,028,847 | 6/1977 | Davis et al. . |
| 4,035,949 | 7/1977 | Ruthner . |
| 4,035,950 | 7/1977 | Anselm . |
| 4,163,342 | 8/1979 | Fogg et al. ................. 47/DIG. 6 X |
| 4,166,341 | 9/1979 | Vestergaard . |
| 4,196,544 | 4/1980 | Davis et al. ............................. 47/17 |
| 4,209,943 | 7/1980 | Moeller et al. ..................... 47/59 X |
| 4,216,618 | 8/1980 | Haub et al. . |
| 4,289,116– | 9/1981 | Williams ............................. 47/17 X |
| 4,379,375 | 4/1983 | Eisenberg et al. . |
| 4,399,634 | 8/1983 | O'Hare . |
| 4,476,651 | 10/1984 | Drury ................................. 47/17 X |
| 4,616,696 | 10/1986 | Brundrett et al. ................... 47/17 X |

FOREIGN PATENT DOCUMENTS

| | | | |
|---|---|---|---|
| 932961 | 9/1973 | Canada ..................................... 47/65 |
| 0108362 | 5/1984 | European Pat. Off. . |
| 0143340 | 5/1985 | European Pat. Off. . |
| 513124 | 2/1955 | Italy ......................................... 47/18 |
| 66509 | 9/1950 | Netherlands ............................ 47/17 |

OTHER PUBLICATIONS

Prince, R. P. and Bartok, J. W. Report to Environmental Committee of General Assembly of State of Connecticut, Storrs, Conn., Apr. 1976.
Bartok, J. W. and Ashley, R. A. "Plants That Never See the Sun", *Milestones,* Univ. of CT, pp. 5–6. Fall–Winter 1972–1973.
Bartok, J. W. "Controlled Environment Plant Growth Systems", Paper No. NA75–402; For Presentation at the 50th Anniversary Meeting, American Society of Agricultural Engineers, Ithaca, N.Y., Aug. 17–20, 1975.
Prince, R. P. and Bartok, J. W. "Design of an Experimental Controlled Environment Leaf Lettuce Production Unit", Paper No. NA75–408; For Presentation at the North Atlantic Region Meeting American Society of Agricultural Engineers, Ithaca, N.Y., Aug. 17–20, 1975.
Prince, R. P. and Bartok, J. W. "Lettuce Production in a Combination Growth Room–Greenhouse", (undated).

(List continued on next page.)

*Primary Examiner*—Robert A. Hafer
*Assistant Examiner*—Danton D. DeMille
*Attorney, Agent, or Firm*—Hall, Myers & Rose

[57] ABSTRACT

An integrated hydroponic system including subsystems for support and movement of plants, controlling the atmosphere around the plants and nutrient distribution. The support and movement subsystem features diverging trough-in-trough construction where the interior trough is formed by discrete autoclavable plastic troughs which are slidably removable for sanitation purposes from supporting exterior troughs which in turn support nutrient distribution tubing and a rotatable variable pitch drive screw for moving individual plant holders along the troughs in graduated increments. The atmospheric control system features supply and exhaust ducts under the troughs which establish a blanket of air in the zone proximate to the trough where the temperature, humidity and carbon dioxide concentration are regulated. The nutrient distribution system involves recycling the thermally and component regulated dilute nutrient fluids from a reservoir to the plants and back into the reservoir.

53 Claims, 3 Drawing Sheets

OTHER PUBLICATIONS

Prince, R. P. and Bartok, J. W. "Can Leaf Lettuce Be Grown Under a Controlled Environment?", Reprinted from Research for Connecticut by the Storrs Agricultural Experiment Station, pp. 5-6, Research Report 47. Sep. 1977.

Prince, R. P. and Bartok, J. W. "Plant Spacing for Controlled Environment Plant Growth". *Transactions, ASAE* (vol. 21, No. 2, pp. 332-336, 1978).

Prince, R. P. and Bartok, J. W. "Conservation of Energy Through Integrated Vegetable Production Systems". Proceedings of the 1978 National Conference on Technology for Energy Conservation. Jan. 24-27, 1978, Albuquerque, N. Mex. pp. 68-75.

Prince, R. P. and Bartok, J. W. "An Integrated Growth Room-Greenhouse System". Paper No. 79-4530; For Presentation at the Winter Meeting, American Society of Agricultural Engineers, New Orleans, La., Dec. 11-14, 1979.

Bartok, J. W. and Prince, R. P. "Control of Energy in an Integrated Growth Room-Solar Greenhouse". Paper No. 80-4529; For Presentation at the 1980 Winter Meeting, American Society of Agricultural Engineers, Chicago, Ill., Dec. 2-5, 1980.

Prince, R. P. and Bartok, J. W. "Simulation of Lettuce Growth and Spacing Criterion". Paper No. 81-4577; For Presentation at the Winter Meeting, American Society of Agricultural Engineers, Chicago, Ill., Dec. 15-18, 1981.

Prince, R. P. and Bartok, J. W. "Checklist for Planning Controlled Environment Plant Growth Systems". Agricultural Engineering, Univ. of CT Cooperative Extension Service, Nov. 1981.

Prince, R. P. and Bartok, J. W. "Controlled Environment Vegetable Production Technology Projection". Paper No. 82-4050; For Presentation at the 1982 Summer Meeting, American Society of Agricultural Engineers, University of Wisconsin-Madison, Jun. 27-30, 1982.

Prince, R. P. and Bartok, J. W. "Plant Support Devices for Controlled Environment Vegetable Production Units". Paper No. 82-4052; For Presentation at the 1982 Summer Meeting, American Society of Agricultural Engineers, University of Wisconsin-Madison, Jun. 27-30, 1982.

HYDROPONIC ASSEMBLY

TECHNICAL FIELD

This invention relates to hydroponics, and more particularly, a system for labor and energy efficient growth of domesticated plants incorporating means for effecting controlled spacing, controlled environment, and controlled lighting.

BACKGROUND OF THE INVENTION

The population crisis, energy crises, regional droughts, prospective extra-terrestrial and oceanic development, as well as general environmental conditions, have spurred experimentation, commercial exploitation, and dedication of energy and resources to wholly artificial plant husbandry mechanisms, particularly directed to growth of nutritional plant life and human food stuffs. The technology relating to the foregoing is generally referred to as hydroponics. Due to the growing sophistication of hydroponic technology and the stringent environmental requirements, efficiency considerations are paramount in order to render the technology commercially viable. Strict environmental control required for this discipline includes nutrient quality monitoring, temperature and humidity regulation and carbon dioxide concentration flow control, light impingement control, and lastly, geometry and spacing control between individual growing plants.

Much effort has been dedicated to resolution of the general problems in hydroponics and perfecting those controls described above. As a result of these efforts, many examples of apparatus and methods directed to one or more of the foregoing problems are readily available in the marketplace and literature. Indeed, publications describe many hydroponic growth systems which incorporate features directed specifically to the foregoing concepts.

For example, U.S. Pat. No. 4,216,618 discloses a hydroponic assembly featuring a drive system incorporating variable pitch drive screws for accomplishing automatic separation of plants. The plants are contained in holders which engage the screws to move the plant along a trough at increasing intervals. To underscore the importance of plant spacing and the geometry of separation, the systems disclosed in U.S. Pat. No. 4,028,847, diverging angular dual troughs, and U.S. Pat. No. 4,035,949, a systematic and continuous separation accomplished by a greenhouse conveyor system are illustrated.

One of the more comprehensive disclosures relating to plant spacing is contained in U.S. Pat. No. 4,166,341, issued to Vestergaard. Vestergaard describes numerous systems and methods for achieving variable and increasing spacing in hydroponics. Among the featured automatic spacing apparatus are angularly diverging troughs, spring-loaded parallel separable troughs, and parallel channels merging into single channels, which in turn, eventually merge into one channel. Vestergaard also describes additional hydroponics concepts. First, a nutrient provision system wherein fresh nutrient is provided by squirting through outlets at the top of the main trough and into porous plant holder blocks containing the plant roots. These blocks are supported on an elongated trough-like member. The trough also serves as a liquid reservoir for the cultivation media, a root growth restraint mechanism, and a guide for movement of the blocks. Vestergaard also describes opposing, flexible opaque flaps which extend upwardly and outwardly above the trough thereby permitting translation of the plant through the trough but minimizing the quantity of light being able to enter the trough. This provision allows for carbon dioxide and hot and cold air to be delivered in a manner where the gas circulates slowly around the leaves, thereby reducing overall carbon dioxide requirements as well as minimizing the quantity of light entering the trough interior It is well known in the hydroponic art that light and nutrient lead to unwanted algae growth. Hence, the flaps are relied upon to deter algae growth.

A host of additional publications include descriptions which focus on many of the foregoing and other aspects of hydroponic farming structures and methods but none combine a total concept system which addresses spacing, energy, temperature, gas concentration, humidity, nutrient, and light control.

SUMMARY OF THE INVENTION

It is an object of this invention to provide a total concept hydroponic farming system.

It is a further object of this invention to provide an economical, efficient and commercially viable hydroponic system.

Still another object of this invention is to provide a hydroponic farming system which permits for uninterrupted plant growth and minimum labor requirements.

Another object of this invention is to provide maximum plant density and a minimum of space requirements to achieve economical yields.

Still another object of this invention is to create optimal growing conditions by improving strict environmental control at plant growth levels within a greenhouse.

Another principal object of this invention is to provide a hydroponic growth system which maximizes sanitation and minimizes disease.

Still another object of this invention is to provide a hydroponic growth system which maximizes energy efficiency and minimizes space, light and environmental control costs.

These and other objects are satisfied by a hydroponic plant growth and farming system, incorporating a trough subsystem defined by a plurality of continuous exterior support troughs, a plurality of removable, interior troughs of discrete lengths slidable within each of said exterior troughs, individual plant holders, and plant holder moving means for translating said plant holders along the length of each of said exterior troughs. The system also includes an atmospheric control subsystem incorporating means for establishing a controlled atmospheric blanket around said trough subsystem, said atmospheric control subsystem including thermal control means for controlling the blanket temperature and distribution means for establishing controlled airflow over the entire length of said exterior troughs; a nutrient and water distribution subsystem is also featured which includes a reservoir containing diluted nutrient, a pump, and distribution means substantially coextensive with each of said exterior support troughs and supported thereby.

Other objects are satisfied by a trough assembly for a hydroponic farming facility, comprising a plurality of continuous outer troughs, a plant supporting means, and interior troughs of discrete lengths, contained and slidable within said outer trough, said interior troughs being slidably removable from each of said outer troughs and said interior trough being designed to contain plant roots supported by said supporting means.

The objects of the invention are satisfied by an atmospheric control system associated with a multitude of elongated troughs all lying in a plane, for hydroponic farming, comprising:
 (a) a primary intake duct,
 (b) a primary output duct,
 (c) a plurality of shrouded conduits essentially coextensive with and underlying a selected number of troughs,
 (d) at least one supply outlet associated with each shrouded conduit in atmospheric communication with said primary output duct,
 (e) at least one exhaust duct associated with each shrouded conduit and in atmospheric communication with said primary intake duct, each exhaust duct having apertures spaced therealong to provide a substantially uniform flow of air from a zone around the troughs and into the exhaust duct, and
 (f) fan means for moving air through said primary intake duct and into said primary output duct.

Still other objects of this invention are satisfied by a hydroponic farming nutrient recirculation and provision system for providing nutrients to plants in troughs, comprising:
 (a) a dilute nutrient reservoir,
 (b) reservoir temperature control elements including fluid heating means and a thermostat for actuating said heating means,
 (c) water input pipe,
 (d) fluid output pipe,
 (e) at least one pump connected to said output pipe to pump dilute nutrient from said reservoir,
 (f) fluid distribution means for distributing nutrient to plants in the troughs,
 (g) fluid collection means for collecting runoff nutrient fluid from the troughs,
 (h) irradiation means to at least partially sterilize the runoff nutrient fluid, and
 (i) filter means for filtering the irradiated runoff fluid which filtrate is returned to said nutrient reservoir.

The present invention, in other words, provides a hydroponic plant growth system which is based on integrated subsystems involving controlled movement of growing plants while supplying the elements required for optimum plant growth. Highlights of the invention include the employment of a single plant holder without the need to transplant during the entire growth cycle The plant, while in the holder, is transferred once, about midway through the growth period, from one trough to another. This represents a considerable labor savings over present systems. The system utilizes space with maximum efficiency in order to reduce energy or nutrient loss. Maximum space utilization is accomplished by use of diverging troughs and automatic graduated rectilinear movement of individual plant holders along those troughs where the motive power is supplied by a variable pitch drive screw apparatus. The quantity of movement of each plant holder is governed by the pitch of the screw which is based empirically and botanically on the median volume requirements of plants at each stage of growth.

As a result of providing the minimum space necessary for effective growth, shields are not necessary to prevent light from entering the trough which will cause algae growth. The controlled graduated spacing corresponds to plant growth and, consequently, the growing plants themselves block light from the trough. Also, the minimum spacing results in more efficient air circulation, temperature and humidity control.

This invention further employs a laminar air flow concept which leads to considerable cost savings. The laminar flow concept facilitates strict regulation of temperature in the vicinity of the plants as well as control of carbon dioxide and oxygen levels. The general concept borrowed from other disciplines involves a restricted flow of a blanket of air over a target surface, in this case, plants. The confinement of the air to a relatively small volume results in considerable cost savings on the order of a magnitude because of the minimum fuel consumption required to maintain a fixed temperature range. Therefore, the arrangement reduces concern for the overall greenhouse temperature which need not be regulated as closely as would be required with other systems. Moreover, supplemental carbon dioxide may be provided in an economical manner. Another major benefit of this arrangement is it reduces the risk of Botrytis developing on growing lettuce, a favored product of hydroponics, which can develop as a result of a plant sitting in stagnant air with high humidity Botrytis discolors leaves which can affect and even destroy the appearance of an entire crop when the disease spreads.

A critical factor in hydroponic systems is sanitation control. During prolonged use, metabolic poisons concentrate, salts deposit, bacteria fester and algae form within the nutrient containers. Algae can choke off a constant supply of nutrients, for example, to a growing lettuce plant. Accordingly, this invention contemplates the use of a trough-in-a-trough. Standard lengths of plastic, autoclavable interior troughs are set within permanent exterior aluminum troughs. These interior troughs are slidable along and within the external troughs thereby permitting their introduction at the planting end and removal at the harvest end. Thus, the metabolic deposits, etc., resulting from supporting the plant roots during the growing cycle will be washed away during autoclaving. Not only does this concept facilitate the prevention of disease but it also allows for continuous productive operation of the hydroponic system without interruption for sanitation or other cleaning procedures.

The invention also contemplates a modular concept for the mechanical structures This permits routine maintenance without the need for terminating the entire operation. Moreover, by employing smaller, integral components, a component failure may be remedied with a minimum effect on the system.

The above summarized and other aspects of the instant invention will become clear upon review of the illustrated embodiment, described drawings and following detailed description.

BRIEF DESCRIPTION OF THE DRAWINGS

FIG. 9 is a side view of a fabric plant holder insert.

DETAILED DESCRIPTION OF THE ILLUSTRATED EMBODIMENT

All measurements described below are approximations of a prototype unit already constructed. Of course, these are measures provided solely for illustration and are in no way intended to be limiting to the invention.

Figures 1, 2, 3, 4, 5, 6, 7, 8:
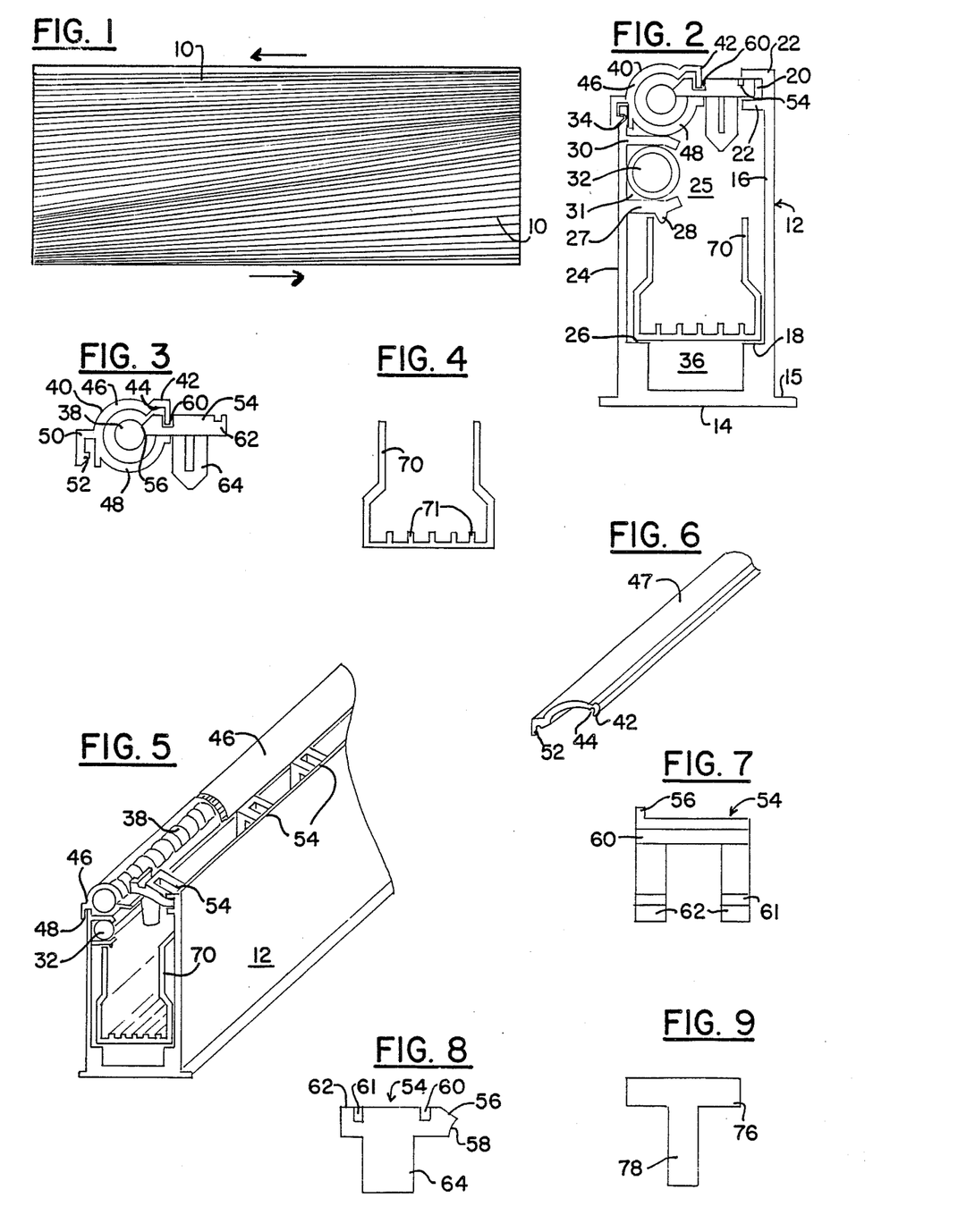
FIG. 1 is a plan view of the diverging trough arrangement of the instant invention.
FIG. 2 is a cutaway side view of an individual trough assembly.
FIG. 3 is a partial cutaway side view of a plant holder and plant holder drive assembly of the invention.
FIG. 4 is a side view of the interior trough of the present invention.
FIG. 5 is a partial cutaway perspective view of an individual trough assembly according to the present invention.
FIG. 6 is a perspective view of the drive screw clamping cover associated with the transition holder.
FIG. 7 is a top view of a plant holder in accordance with this invention.
FIG. 8 is a side view of an individual plant holder.

For purposes of illustration, the invention as used to grow leaf lettuce, a primary hydroponic product, is described. The invention may be easily modified to requirements for other plant products. The overall schematic layout of the trough assemblies 10 of the invention in a greenhouse is depicted in FIG. 1. Specific trough arrangements may be dictated by need. For example, as illustrated, planting and harvesting may be performed on the opposite greenhouse sides. At the one end, referred to as the planting end, trough assemblies 10 are closely spaced together on approximately two-inch centers. At the opposite end, spacing increases to six-inch centers (Six to eight inch centers on the harvest end is the norm for lettuce but other vegetables would be different). The overall width for one rectangular unit is contingent on the number of troughs employed. For example, with 144 troughs in a greenhouse, 72 are planted on one end and 72 on the other, so that there is planting and harvesting on both ends. The desired overall length is about 124 feet over which an individual plant travels in fifteen days.

While one set of troughs 10, illustrated in FIG. 1, may be employed as a nursery for the first fifteen day growth period, given the proper seedling support, such use of the apparatus would amount to inefficient space utilization. Therefore, it is preferred to employ a conventional nursery arrangement for the first fifteen day growth period which is established elsewhere in the greenhouse. Where a conventional nursery is employed, the fifteen day old seedlings may be introduced at both planting ends and harvested at both harvest ends of the trough assembly illustrated in FIG. 1.

Alternatively, the nursery may be incorporated into the illustrated system by constructing a series of troughs on continual two-inch centers from the planting end to the harvest end. Also a small, constant pitch screw 38 may be used, thereby reducing the overall length of the first trough set.

In FIG. 2, a detailed cutaway of the trough system of the instant invention is revealed. Outer trough 12 comprises a channel with a U-shaped cross-section where the height is approximately twice the width A series of projections and rails are formed along the length of the interior of trough 12. These will be described in greater detail below. Trough 12 is constructed of extruded aluminum in uniform lengths of approximately twenty-one and a half feet. The lengths are coupled by conventional methods such as welding and assembled to extend nearly the full length of a greenhouse. At the planting end, these troughs are spaced on approximately 2 inch centers where shoulder projections 15 abut.

Base 14 of trough 12 measures 2.38 inches, including one-quarter inch shoulder projections 15 on opposite sides to facilitate spacing. Right side wall 16 rises four inches above base 14 and features three-quarter inch high interior shelf 18. Optionally, shelf 18 may incorporate spaced rollers or bearings of the same height. Alternatively, rollers, the top surface of which correspond to the top surface of shelf 18, may be attached to the side and project into channel 36. The purpose of such rollers will become apparent below. At the top of wall 16 is quarter inch wide horizontal channel 20 defined by one-quarter inch long matching horizontally projecting rails 22. These extend the full length of trough assembly 10 excepting the first twenty-five inch length at the planting end described below.

Left wall 24 is 3.6 inches high and features interior shelf 26 corresponding to and complementary with shelf 18. Like shelf 18, shelf 26 features rollers or bearings. These shelves provide support for slidably movable trough 70, described below, as well as defining passage 36 therebetween. Passage 36 extends the entire length of trough 12 and serves to collect expended nutrient from the assembly. Not illustrated, but periodically spaced along the bottom of trough 36, are drainage apertures. These are fitted with hoses which lead to a recirculation facility described below.

A little more than one and a half inches above shelf 26, lower horizontal hook rail 27 projects into cavity 25 defined by trough 12. Rib 28 projects downwardly toward shelf 26. It is spaced approximately 0.4 inches from wall 24. Upper J-hook rail 30 is substantially parallel and complementary to rail 27. The opposing rails form 0.68 inch horizontal channel 31 along the side of and extending the length of trough 12. The function of channel 31 is to provide a means for securing double-walled, nutrient supply tube 32 along the trough.

Double-wall tubing 32 is commercially available like that produced by Chapin Watermatics of Watertown, N.Y. The coaxial tubing concept equalizes pressure and insures uniform distribution of nutrient along the entire length of trough 12. The fluid nutrient, under pressure, sprays into cavity 25 from apertures provided in the outer wall.

In practice, the Chapin tubes have been found to clog easily with crystalized nutrient, etc. To overcome clogging, daily flushing of the tubes with water or dissolved nutrient (described below) is recommended. Once a week, a diluted chlorine solution, 1 part per million, is flushed through the tubes and discarded. Regular employment of the foregoing techniques prevents the tubes from clogging or otherwise causing non uniform distribution of nutrient.

The outer surface of wall 24 further includes one-eighth inch, beveled groove 34. It is located one-quarter inch below the upper edge and serves as a securing means for below-described drive screw cover 40.

FIG. 4 isolates trough 70 which is an eleven foot length of molded autoclavable plastic. Trough 70 is constructed to be inserted in channel 25 of trough 12 and be slidable among shelves 18 and 26. Although no necessary, the above-mentioned optional rollers may be provided to minimize frictional resistance when a new trough 12 is introduced at the planting end and a contaminated trough 12 is removed from the harvest end. Trough 70 provides support for plant roots as the plant moves along trough 12, described in detail below. For this reason, it is provided with longitudinal ridges 71 along the bottom. Ridges 71 prevent the plant roots from damming the bottom thereby obstructing free flow of nutrient therealong. Because trough 70 is slidable within and removable from trough 12, each eleven foot length is periodically inserted at the planting end and removed, in succession, from the harvest end.

Upon removal, trough 12 is subjected to autoclaving or another appropriate cleaning procedure which removes salt, concentrated nutrient deposits, organic wastes, root detritus, bacteria, algae, etc. Consequently, the support system of the invention undergoes continuous cleaning without the need to cease operations. Accordingly, unless a system overhaul requiring the entire system to shut down, this arrangement allows for uninterrupted routine cleaning while the facility is in production.

Moving now to FIG. 3, it isolates the drive screw/plant holder assembly. Drive screw 38 is of the variable pitch thread type. Drive screw 38 is fabricated by brazing or gluing a spirally-wrapped, graduated-spaced, one-eighth inch diameter copper wire on a 0.375 inch diameter metal (copper) core rod. Drive screw 38 may also be machined to achieve similar results like that described in U.S. Pat. No. 4,216,618 incorporated herein by reference for this purpose. Drive screw 38 extends the full length of trough 12 and is engineered to provide a variable pitched thread capable of generating rectilinear movement of 25 inches a day at the planting end and graduating to move 150 inches daily at the harvesting end. To achieve such graduation in lettuce farming, eleven pitch changes are recommended over the full length. It is most convenient for purpose of maintenance to construct screws 38 in variable lengths corresponding to that required for twenty-five plants at the given stage (25 inches to 150 inches). When employed for lettuce farming, a growth period of thirty days is desirable. Thus, the plant holder ideally travels the entire trough length in fifteen days.

Electric motors which are mechanically linked to the screws, one at each end, are activated to cause them to rotate along the entire length of each trough. At the planting end, a small, i.e. 1/100, horsepower electric motor is adequate to rotate the screw at approximately 10 rpm. At the harvest end, however, due to the increased torque requirements, a larger, i.e. 1/60, horsepower motor is needed. The screws are generally rotated once a day in a fashion to cycle twenty-five plant holders.

Surrounding and otherwise housing screw 38, as well as being connected to wall 24, is screw cover 40. Screw cover 40, illustrated in greater detail in FIG. 3, includes forwardly disposed lip 42, elongated beveled slot 44, arcuate cover portion 46 and lower support portion 48. Screw cover 40 is made of plastic and is designed to substantially wrap-around screw 48. Cover 46 and support 48 may be separate interfitting components or preferably is a single extrusion element with a hinge connection between support portion 48 and cove portion 46. In either case, carrier 40 is secured to trough 12 by U-shaped engaging member 50. Member 50 includes beveled keeper 52 which is complementary to and snaps into groove 34 described above and provided exclusively for this purpose.

Turning to one inch wide plant holder 54, reference may also be made to FIGS. 7 and 8 for clarification. Holder 52, fabricated of molded plastic, incorporates the following elements: drive screw contacting lug 56 including complementary curved screw contact surface 58, groove 60, channel engaging lugs 62 and vertically descending root holding stabilizers 64.

The interrelationship of trough 12, drive screw 38, drive screw carrier 40 and plant holder 54 is illustrated most clearly in FIG. 5 and will now be briefly reviewed. Plant holder 54 is secured within channel 20 via lugs 62 and projecting lug 56 is lodged against drive screw 38 between the spiral wire portions. Arcuate surface 58 abuts the outer surface of core rod. The lower surface of the portion formed by lug 56 and channel 60 is supported by the upper edge of lower carrier support 48. Lip 42 is slidably recessed within channel 60 in a manner to permit holder 54 to translate along screw 38.

Cover 40 serves to restrict the vertical movement of lug 56 relative to screw 38 as does channel 20 relative to lug 62. Accordingly, holder 54 is able to translate smoothly along screw 38 as lug 56 is maintained in substantial registry therewith.

Moving to the function of plant holder 54, it provides the sole support for the plant from removal of the germinated seed from a conventional germinating nursery, through the initial growth phases corresponding to its first fifteen day transit along troughs 10 and finally after transfer to the planting end of the second trough set, for its second fifteen day period until harvest. Indeed, seeds may even be germinated in the holders and supports described below. Observing FIGS. 7 and 8, extending from below lugs 62 are stabilizers 64 spaced apart by approximately one-half inch to accommodate insertion of plant supports. A germinated seed is held by spongy T-shaped pieces of wicking, autoclavable, spun-bonded polyester 76 (see FIG. 9) which are held by stabilizer 64. A germinated seed so placed is supplied with nutrient because rail 78 extends to near the bottom of trough 70 and capillary action causes the nutrient-laden fluid to reach the young roots. Once the plant is more mature, its roots will extend to and slide along trough 70. As should be apparent, plant holder 54 and the plant are never separated until harvest. No transplanting is required. Only transfer of the holder and plant, together, at the end of fifteen days is required.

Discussion relating to one major structural feature was delayed until the mechanical operation was fully described. Absent from the first twenty-five inches of the trough 10, is channel 20 and unitary screw cover 46. Also, the height of walls 12 and 24 are equal. Modified screw cover 47, depicted in FIG. 6, is used. The modified structure is adapted to facilitate transfer of the chronologically half-grown plants from the nursery to the grow-out area. Transfer is achieved by moving transition holder 65 from the top edge of wall 12 of a trough in the first trough set to wall 12 of the second trough set. Holder 65, depicted more clearly in FIG. 14, includes U-shaped channel 67 adapted to engage the top edge of wall 12 where slotted passage 69 lies above the edge and when properly positioned is coextensive with channel 20. Holder 65 is constructed of plastic and serves to support individual plant holders 54 by having rail 68 project into slot 61. It is desirable to cull weaker plants from the system at time of transfer. Accordingly, it is desirable to have as many as thirty-one individual holders 54 and plants in holder 65 prior to transfer. Rail 68 is somewhat pliant for this purpose so that a target holder 54 may be twisted out of holder 65. Thus, only twenty five plants are transferred.

Transfer is accomplished by removing holder 65 from the first set and clamping onto the second set of troughs. Modified cover portion 47 is clamped over wall 24 and lip 42 engages slot 60 on the newly transferred holders 54, thereby stabilizing them for movement by screw 38 the next day.

Having now described the mechanical components of the hydroponic system contemplated by this invention, the reader's attention is directed to the air, humidity and gas concentration control system and the nutrient fluid system.

Figures 10, 11, 12, 13, 14:
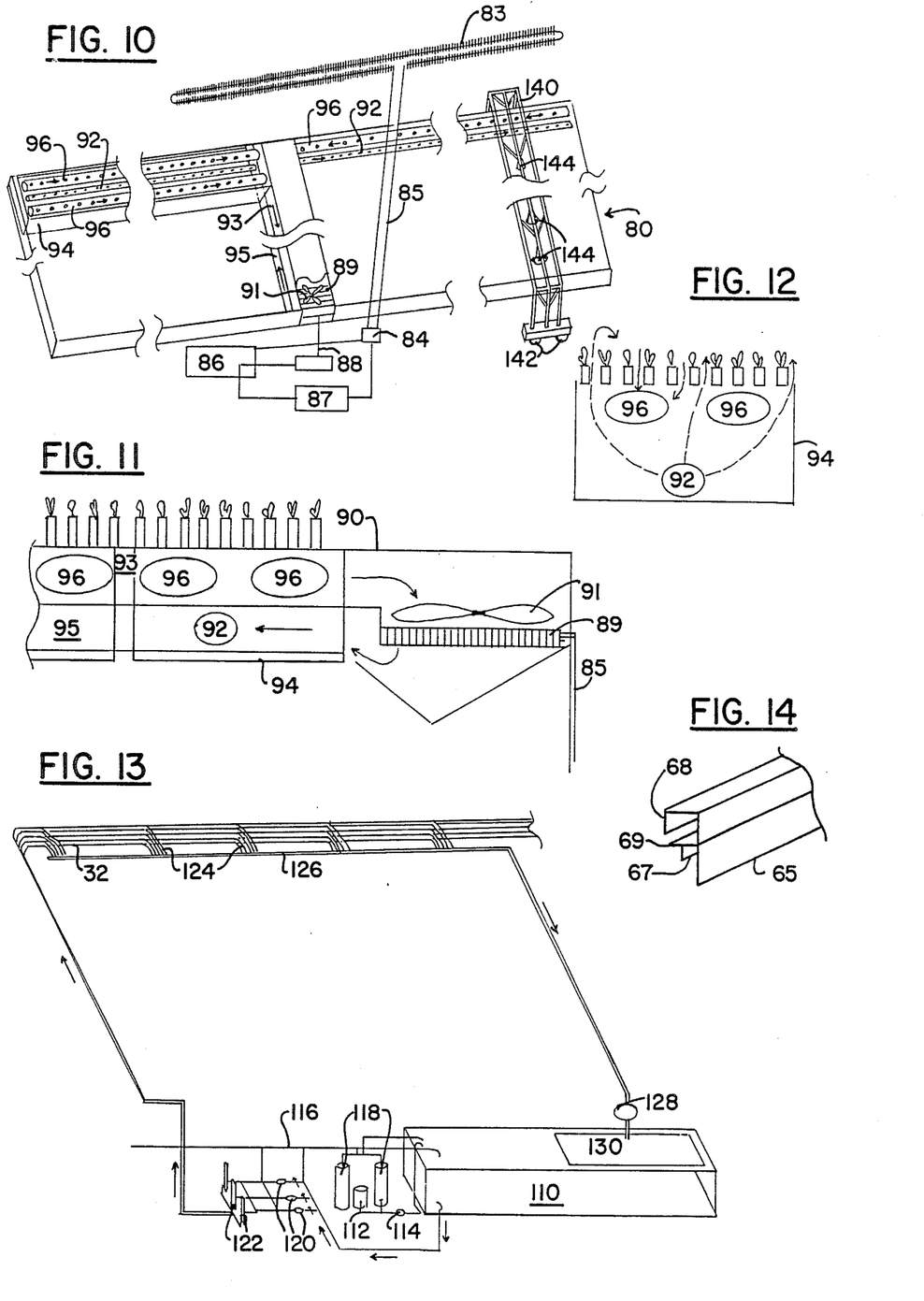
FIG. 10 is a partial plan view of the air supply and temperature control system.
FIG. 11 is a partial cutaway side view of the atmospheric recirculation system illustrated in FIG. 10.
FIG. 12 is a diagrammatic representation of air flow around the plants and troughs.
FIG. 13 is a partial plan view of the nutrient circulation system.
FIG. 14 is a partial perspective view of the transition holder.

Referring to FIG. 10, atmospheric and environmental control system 80 is featured. This control system employs two essential sub-systems, one for heating and cooling and the second for distribution and recycling. Turning first to the heating and cooling systems, the basement of the greenhouse contains water storage tank 86. Tank 86 is of conventional concrete construction and, preferably, is large enough to hold up to 4,000 gallons of water. Pump 84 is employed to circulate water from the tank 86 through ceiling collector 83 where the water from the storage tank passes through thin tube solar collectors 83 at a small flow rate. Disposed at ceiling level on the inside of the greenhouse, solar collector 83 features radiating fins of conventional construction to absorb radiant energy produced by the sun during the daytime. Collector 83 is preferably constructed from small diameter, small volume tubing to maximize heat absorption by the flowing water. Water circulates from tank 86 by pump 84 through pipes 85 into solar collector 83 back through pipes 85 and into tank 86. On a sunny day, water flowing through this circuit is passively warmed and returned to tank 86 for later recirculation into the air circulation system at anytime when the temperature as registered by a thermostat placed near plant level registers the need for more heat. In order to achieve maximum efficiency and economy, provided with the system is a heat pump connected to one of pipes 85 in order to dispose of undesired heat and/or to augment the heat content of the water supplied by passive ceiling collector 83. It is contemplated that solar heating of the water will not supply adequate heat. Accordingly, through pipes 88, tank 86 is connected to an auxilliary boiler furnace for heating the water.

The heated water provided by the above-described heating/cooling recirculation system is contained within heat exchanger 90 (see FIG. 11). It should be noted that the larger the capacity of tank 86, the greater the heat capacity and the greater the fuel savings for thermal control. Heat exchanger unit 90 extends along the transverse bisector of troughs 10. It houses heating and cooling coil 89 and 10,000 cfpm (cubic feet per minute) fan 91 positioned above coil 89. Fan 91 forces air through the coil. The air supply to the fan is provided through upper return chamber 93 and the slightly pressurized air (positive air pressure) emanating from coil 89 travels through lower supply chamber 95. Air travelling through lower supply chamber 95 flows into one of the number of supply ducts 92 extending to either side under troughs 10. To insure uniform flow distribution, the radius of the openings of the ducts 92 should be varied. Thus, the openings of the ducts nearest the fans will be made smaller than more remote ducts.

Further clarification on the particular structure of the individual supply and return air ducts underlying troughs 10 is provided in FIG. 12. For each duct system there is exterior shroud 94 made from plastic sheeting or other appropriate material which underlies each duct unit. Slightly pressurized air being supplied along duct 92 escapes through appropriate apertures contained along its length. The apertures are more closely spaced at the far end of duct 92 than those positioned near the junction of duct 92 and supply chamber 95. This is done in order to achieve a more uniform distribution of heated air to the plants. Disposed below troughs 10 but above supply duct 92 are apertured, eliptical exhaust ducts 96. Preferably, there are two exhaust ducts 96 at the harvest end of a set of ten troughs and only one duct at the planting end. Ducts 96 are fabricated from 18 inch eliptical aluminum ducting with intake apertures having 3 inch diameters. The apertures are spaced approximately three inches apart at the remote end of the duct and approximately seven to eight inches apart near the intersection with exhaust duct 93.

Air circulation in the system is achieved as follows: slightly pressurized by fan 91, air passes through coil 89 where it is heated or cooled and into primary supply duct 95. Supply duct 95 may also incorporate an injection port for controlled addition of carbon dioxide from an appropriate source such as a tank, thereby permitting carbon dioxide enrichment of the air supply flowing to the plants The pressurized air travels along duct 95 and enters supply ducts 92. The enriched and warmed air flows out of the properly spaced apertures provided in supply duct 92 and up around the entire length of troughs 10. As fan 91 causes the air in primary supply duct 95 to be slightly pressurized relative to the remainder of the system, it also creates a slight vacuum (negative air pressure) along primary exhaust duct 93. In turn, exhaust ducts 96 underlying troughs 10 feature a slight negative pressure which draws the air above exhaust ducts 96 therein.

This arrangement establishes a means for controlled recirculation of air around troughs 10 and a temperature control system. This is accomplished because the slightly pressurized air being supplied through duct 92 is drawn back into exhaust ducts 96 after it has circulated around troughs 10 and the plants contained therein. Once a desired equilibrium or set of environmental conditions is established, a thermal blanket or laminar airflow is established over troughs 10 and the plants contained therein. Hence, the temperature of the air in this continuously recirculating blanket is somewhat independent of that of the rest of the greenhouse. house.

An alternative embodiment to the use of the supply duct 92 is simply to employ the shroud 94 as a plenum chamber whereby the supply air is fed directly into the plenum. The spacing of exhaust gas collecting openings along exhaust ducts 96 govern the establishment of a substantially uniform vacuum along the entire length of the ducts thereby creating a blanket effect similar tO that described above without the need of the additional component. The use of supply duct 92, however, lends itself to enhanced distribution of the thermally controlled and enriched air supplied into each of the shrouded units.

Referring now to the nutrient circulation system diagrammatically represented in FIG. 13, it features large nutrient tank 110 which contains the nutrient fluid to be distributed to the plant's trough assemblies 10.

Nutrient tank 110 contains diluted nutrients supplied to it via concentrated nutrient supply tank 112 and pump 114. Water for diluting the concentrated nutrient is supplied directly into tank 110 by water supply pipe 116. Water supply pipe 116 also feeds into hot water heaters 118 to insure that the nutrient mixture maintains a substantially constant temperature. The nutrient mixture contained in nutrient tank 110 is pumped to the tanks via pumps 120 arranged in parallel to insure continuous uniform flow of nutrients to the plants even in the event of mechanical malfunction of one of the pumps.

Nutrient is pumped through microfilters 122 and then along an appropriate supply line to the double walled nutrient tubes 32 described above. Once sprayed into troughs, the nutrient eventually drains into passages 36 having connected thereto at spaced intervals drainage hoses 124. These drainage hoses feed into primary drain tube 126 which in turn directs the waste nutrients to nutrient tank 110. Before flowing into nutrient tank 110, however, the waste nutrient is exposed to ultraviolet radiation at UV treatment station 128 in order to sterilize the solution thereby substantially eliminating bacterial waste products. Upon passing from UV treatment station 128, the nutrient is filtered by filter 130 and then reintroduced into nutrient tank 110.

The foregoing nutrient solution recirculation system allows not only for control of the nutrient level flowing to the individual plants, but also assures that the temperature of the nutrient is maintained at optimal growth conditions. Additionally, unwanted disease and contamination is prevented as a result of sterilizing treatment and appropriate filtering.

The lighting system consists of two movable units. Each unit 14D is a gantry which extends across the entire width of the greenhouse and provides direct lighting by lights 144 to approximately thirty lineal feet of troughs 10. When not in use, it is desirable that the gantries are of a construction to minimize shadow production. Welded steel tubes forming a conventional triangular cross-section beam provides such a structure. Each gantry is on rollers 142 and is preferably motorized for easy movement along the greenhouse. The two gantries provide direct lighting to half the greenhouse. Since it has been found in lettuce farming that sixteen hours of light constitute an optimal growing condition, twelve hours of natural light may be supplemented with four hours of artificial light. With movable gantries, equipment requirements are reduced. The gantries are first positioned to illuminate one-half of the greenhouse for four hours and then moved to illuminate the other half. An additional feature which may be incorporated with the gantries is a conventional "cherry-picker" device to allow a man to move freely over the troughs for maintenance or observation purposes.

Another variation to the overall system configuration would be to eliminate the above-described lighting gantries and substitute a fiber optic system. Such a fiber optic system could employ light dispensing members similar to those described in U.S. Pat. No. 3,433,940, incorporated by reference herein for this purpose. The units would be positioned along the entire length of trough assembly 10 to assure uniform lighting.

Of other enhancements for the above-described system, independent backup power generators or cogenerators are connected with the nutrient and air circulation systems and the lighting system. Thus, even if the facility is deprived of electricity, for an extended period of time, the growing crop will not be lost.

Referring briefly to the use of solar heating, the facility may include an air plenum system at the top of the greenhouse. Sun-warmed air is drawn into a two foot decanter thin-walled plastic tube by a fan (like fan 91) which directs the air into the basement where it is forced through a conventional air/water baffled heat transfer chamber to heat the water in tank 86.

The foregoing system may be employed in conventional greenhouses. However, it is desirable to construct the system in a structure which maximizes solar energy utilization, minimizes construction costs and minimizes shadows. Such a structure is described in U.S. Pat. No. 4,065,906, incorporated herein by reference for this purpose.

The foregoing has described a system for hydroponic growth which incorporates three primary subsystems. One, geometric spacing of growing plants; two, atmospheric environmental control; and, three, nutrient supply system. Combined into an integrated system, the efficient and economical hydroponic farming system contemplated by the invention is achieved. Accordingly, each sub-system, its alternatives, and the combined growth system are contemplated herein as the invention. There should now be apparent to those of ordinary skill in the art, many modifications and variations to the above-described embodiments. As such, these variations and modifications are contemplated to fall within the scope and spirit of the invention as defined by the following claims.

We claim:

1. A trough assembly for a hydroponic farming facility, comprising:
 a plurality of continuous outer troughs, a plant supporting means engaging and translatable along one of said outer troughs, and a plurality of interior troughs of discrete lengths, contained and slidable within each of said outer troughs, said interior troughs being slidably removable from each of said outer troughs and said interior troughs being designed to contain plant roots supported by said supporting means.

2. An assembly according to claim 1 further comprising a plant moving means for moving the plants supported thereby along the entire length of the outer trough.

3. An assembly according to claim 2 further comprising spaced drainage means being integrated within each outer trough whereby any flowable materials drain from said interior trough into said outer trough and from said outer trough into said drainage means.

4. An assembly according to claim 3 where each outer trough includes an interior shelf for supporting said interior troughs above said drainage means.

5. An assembly according to claim 4 where said shelf comprises roller means for facilitating translation of said interior troughs relative to said outer trough by reducing frictional engagement therebetween.

6. An assembly according to claim 4 wherein said outer trough includes a nutrient distribution means.

7. An assembly according to claim 6 wherein said nutrient distribution means is a first elongated channel extending the length of said outer trough above said interior trough and a length of double-walled tubing at least coextensive with said channel and secured therein.

8. An assembly according to claim 3 wherein each outer trough includes complementary elongated shelves extending substantially the entire length of said outer trough where said shelves serve as a guide for translating and as a support for the interior troughs along the length of the troughg assembly.

9. An assembly according to claim 8 further including a drive means for moving a plant rectilinearly along the length of the trough assembly and a horizontal channel positioned in close proximity to the respective upper edges of each of said outer troughs.

10. An assembly according to claim 9 wherein said drive means is a variable pitch screw and further comprising a plant holder for supporting said plants within said trough assembly, said plant holder having a substantially U-shaped configuration with a base and two legs where the base substantially abuts said screw and a portion of the legs is slidably received within said horizontal channel to translate therealong.

11. An assembly according to claim 10 wherein said plant holder features an elongated groove formed within the base and a lug projecting from the base for directly engaging the threads of said screw whereby upon rotation of said screw, the plant holder translates therealong.

12. A device according to claim 10 further comprising a cover means for securing said plant holder to said screw, said cover means being securable to the upper edge of said outer trough and having a lip complementary to and projecting into said groove and said plant holder.

13. A trough assembly according to claim 12 where a predetermined length of said outer trough constitutes a vertically projecting wall where the top of the wall is parallel to the drive screw.

14. An assembly according to claim 13 further including a two channel, transition holder capable of fitting over the upper edge of the outer trough wall and which permits the plant holders to engage the said drive screw to translate along the trough assembly.

15. An assembly according to claim 14 wherein said transition holder is composed of flexible and resilient plastic and where the upper channel includes a downwardly projecting lip, said plant holder includes grooves at the end of the legs where said grooves are parallel to the base groove and complement the projecting lip of the transition holder to be slidably secured thereto.

16. An assembly according to claim 1 further comprising a rectilinear drive means for moving a plant along the length of the trough assembly.

17. An assembly according to claim 16 wherein said drive system comprises a variable pitch screw connected to and rotated by an electric motor.

18. An assembly according to claim 1 where said interior trough features elongated, interiorly projecting ridges extending along its entire length.

19. An assembly according to claim 1 where said interior trough is composed of autoclavable plastic.

20. A trough assembly according to claim 1 further comprising a nutrient recirculation and provision system including
(a) a dilute nutrient reservoir,
(b) reservoir temperature control elements including fluid heating means and a thermostat for actuating said heating means,
(c) water input pipe,
(d) fluid output pipe,
(e) at least one pump connected to said output pipe to pump dilute nutrient from said reservoir,
(f) fluid distribution means for distributing nutrient to plants in the troughs,
(g) fluid collection means for collecting runoff nutrient fluid from the troughs,
(h) irradiation means to at least partially sterilize the runoff nutrient fluid, and
(i) filter means for filtering the irradiated runoff fluid which filtrate is retruned to said nutrient reservoir.

21. In a hydroponic plant growth and farming system,
a trough subsystem having a planting end and a harvest end defined by a plurality of continuous exterior support troughs, a plurality of removable, interior troughs of discrete lengths slidable within each of said exterior troughs, individual plant holders supported by said exterior troughs, and plant holder moving means for translating said plant holders along the length of each of said exterior troughs;
an atmospheric control subsystem incorporating means for establishing a controlled atmospheric blanket around said trough subsystem, said atmospheric control sybsystem including thermal control means for controlling the blanket temperature and distribution means for establishing controlled airflow over the entire length of said exterior troughs,
and a nutrient and water distribution subsystem including a reservoir containing diluted nutrient, a pump, and distribution means substantially coextensive with each of said exterior support troughs and supported thereby.

22. A hydroponic system according to claim 21 further comprising controlled lighting system including movable gantries capable of movement in a manner to provide substantially uniform light along the length of exterior trough.

23. A hydroponic system according to claim 21 where said exterior troughs diverge from the planting end.

24. A hydroponic system according to claim 23 where the exterior troughs are spaced on approximately two inch centers at the planting end and six inch centers at the harvest end.

25. A hydroponic system according to claim 24, where said moving means includes a rotating variable pitch screw secured to said exterior trough and said plant holder is engagable with said screw to move therealong.

26. A hydroponic system according to claim 23 where said plant holder moving means graduates the spacing between said plant holders in said exterior troughs, where the spacing increases as the plant holders move from the planting end to the harvest end.

27. A hydroponic system according to claim 21 further comprising a plurality of shrouded passageways under said trough subsystem for distributing the thermally conditioned atmosphere where each passageway contains at least one apertured conduit having a slightly negative air pressure therein.

28. A hydroponic system according to claim 27 where said atmospheric subsystem includes a fan for generating positive air pressure along its front face and negative air pressure at its back face where said positively pressured air is directed through a water containing radiator, the water flow being controlled by a thermostat positioned in close proximity to said exterior troughs and the water being warmed during terrestrially cool days and cooled during terrestrially warm days by a combination of conventional and solar heating elements.

29. A hydroponic system according to claim 28 further comprising means for monitoring and regulating the carbon dioxide atmospheric concentration.

30. A hydroponic system according to claim 21 where said nutrient distribution subsystem further includes means for controlling the temperature of said diluted nutrient, means for filtering particles from said nutrient solution and means for at least partially sterilizing said nutrient.

31. A hydroponic system according to claim 30 where said distribution means is integrated with and supported by said exterior trough and said nutrient is directed from said distribution means and into said interior troughs.

32. A hydroponic system according to claim 31 where said nutrient distribution system includes a means for collecting expended nutrient from said interior troughs, and recirculating said nutrient to said reservoir.

33. A hydroponic system according to claim 21 where said interior troughs are composed of autoclavable plastic and the base thereof defines continuous, elongated, interiorly projecting ridges.

34. A hydroponic system according to claim 33 further including a second trough subsystem and transition holder means to facilitate transfer of plant holders from one trough subsystem to said second trough subsystem.

35. A hydroponic system according to claim 21 further comprising fiber optic lighting system closely associated with said trough subsystem to illuminate plants contained therein.

36. A hydroponic plant growth system according to claim 1 where the nutrient and water distrbution system includes
    (a) reservoir temperature control elements including fluid heating means and a thermostat for actuating said heating means,
    (b) water input pipe,
    (c) fluid output pipe,
    (d) said pump connected to said output pipe to pump dilute nutrient from said reservoir,
    (e) fluid distribution means for distributing nutrient to plants in the troughs,
    (f) fluid collection means for collecting runoff nutrient fluid from the troughs,
    (g) irradiation means to at least partially sterilize the runoff nutrient fluid, and
    (h) filter means for filtering the irradiated runoff fluid which filtrate is returned to said nutrient reservoir.

37. A system according to claim 36 further comprising a concentrated nutrient tank in fluid communication with said reservoir.

38. A system according to claim 37 where said heating means is a discrete hot water heater in fluid communication with said reservoir.

39. A system according to claim 36 further comprising a microfilter means disposed between said reservoir and said fluid distribution means for filtering the nutrient.

40. A system according to claim 39 where said fluid distribution means is a double walled tube.

41. A system according to claim 36 where said irradiation means is an ultra-violet light source.

42. An atmospheric control system associated with a multitude of elongated troughs all lying in a plane, for hydroponic farming, comprising:
    (a) a primary intake duct,
    (b) a primary output duct,
    (c) a plurality of shrouded conduits essentially coextensive with and underlying a selected number of troughs,
    (d) at least one supply outlet underlying said troughs and associated with each shrouded conduit in atmospheric communication with said primary output duct,
    (e) at least one exhaust duct underlying said trough, associated with each shrouded conduit and in atmospheric communication with said primary intake duct, each exhaust duct having apertures spaced therealong to provide a substantially uniform flow of air from a zone around the troughs and into the exhaust duct, and
    (f) fan means for moving air through said primary intake duct and into said primary output duct.

43. A system according to claim 42 further comprising thermal control means for controlling the temperature of air flowing through said primary intake duct.

44. A system according to claim 43 where said control means comprises a thermostat positioned substantially at plant level and a radiator where heat content of the radiator is controlled by the thermostat when the temperature of the air circulating around the troughs drops below a preset temperature.

45. A system according to claim 43 where said thermostat control means incorporates a heater tank in which warm water circulates to a radiator disposed proximate to and ahead of said fan means.

46. A system according to claim 45 where said water contained in the water tank is heated by a combination of solar and conventional heating means.

47. A system according to claim 46 where said conventional heating means includes a heat pump, cooling tower, and furnace.

48. A system according to claim 47 where heating by the heat pump and furnace is coordinated with solar heat collecting means.

49. A system according to claim 42 where said supply outlet is an apertured duct disposed within the shrouded conduit and beneath said exhaust duct.

50. A system according to claim 49 where the primary intake and the primary outlet ducts underly, are perpendicular to and bisect the elongated troughs and the one supply outlet and one exhaust duct underly a selected of troughs at the planting end and one supply outlet and two exhaust ducts underly the selected number of troughs at the harvest end.

51. A system according to claim 50 further including means for regulating the carbon dioxide concentration in the zone around the troughs.

52. A system according to claim 42 further including means for monitoring and regulating the carbon dioxide concentration in the zone around the troughs.

53. An atmospheric control system according to claim 42 further comprising a nutrient recirculation and provision system for providing nutrients to plants in troughs including
    (a) a dilute nutrient reservoir,
    (b) reservoir temperature control elements including fluid heating means and a thermostat for actuating said heating means,
    (c) water input pipe,
    (d) fluid output pipe,
    (e) at least one pump connected to said output pipe to pump dilute nutrient from said reservoir, (f) fluid distribution means for distributing nutrient to plants in the troughs, (g) fluid collection means for collecting runoff nutrient fluid from the troughs, (h) irradiation means to at least partially sterilize the runoff nutrient fluid, and (i) filter means for filtering the irradiated runoff fluid which filtrate is returned to said nutrient reservoir.

* * * * *